Figure 4:
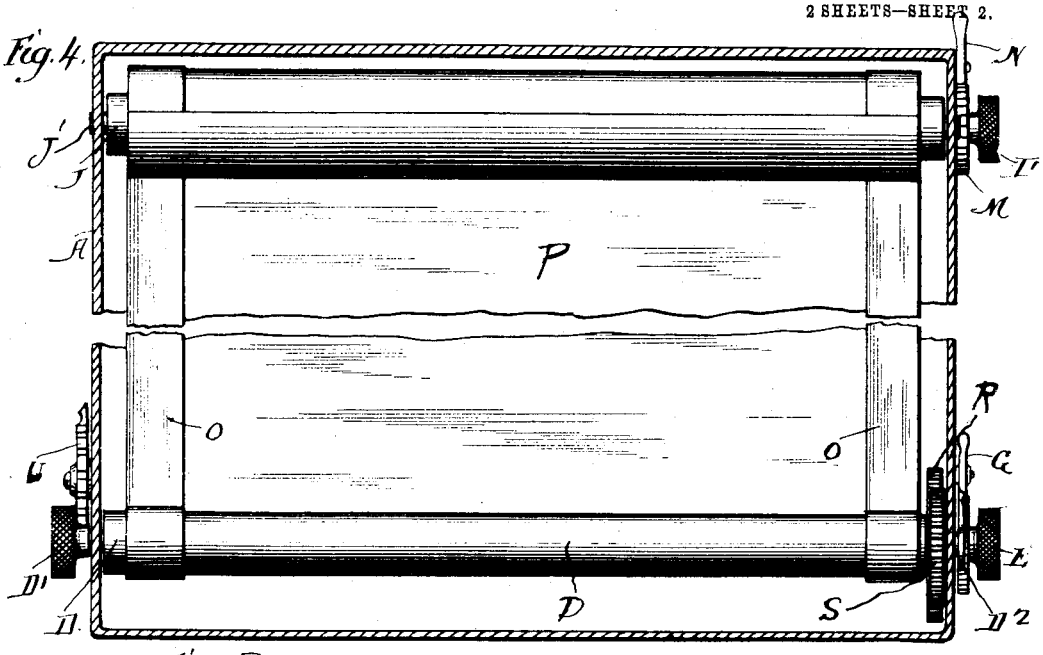

No. 792,361. PATENTED JUNE 13, 1905.
R. H. STOCOUM & T. WILLSIE.
PHOTOGRAPHIC SHUTTER.
APPLICATION FILED JUNE 21, 1904.
2 SHEETS—SHEET 1.
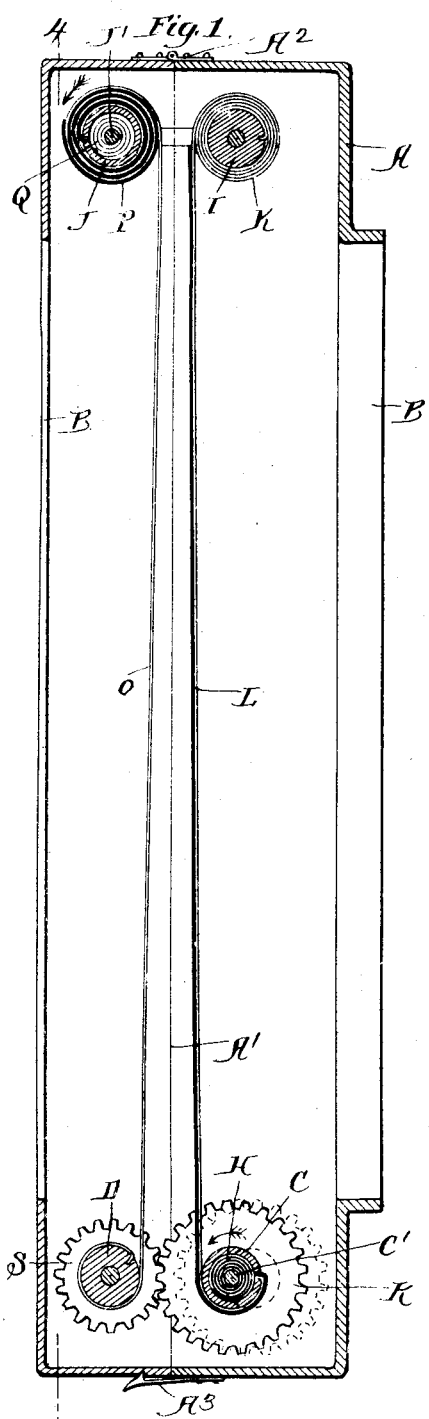
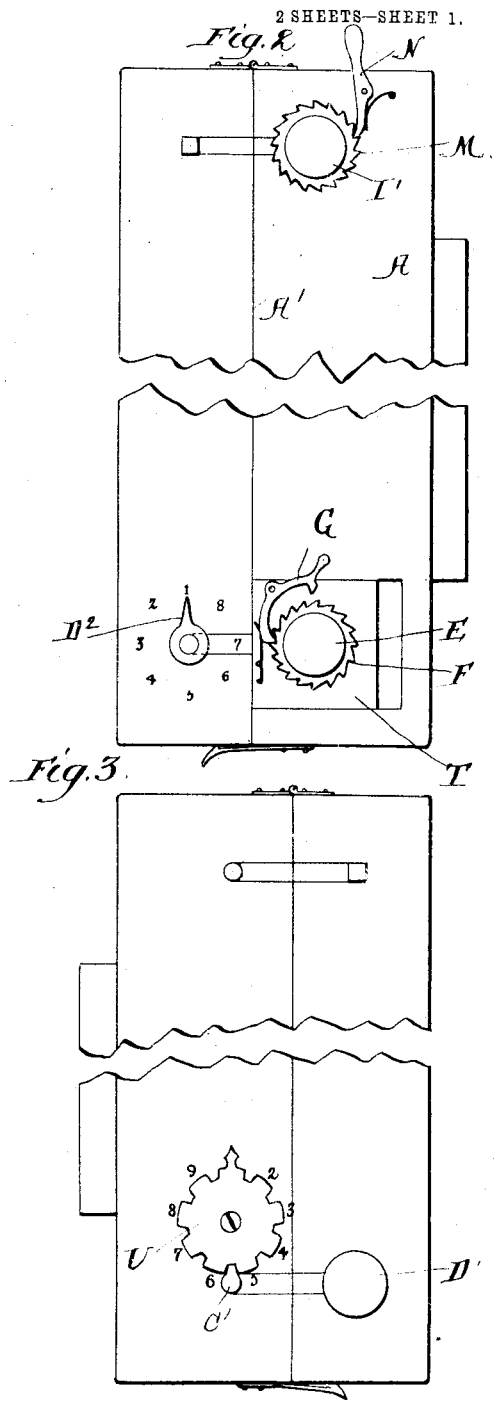
Witnesses:
H. B. Hallock
L. H. Morrison
Inventors
Rollin H. Stocoum
Thomas Willsie
By Atty.

No. 792,361. PATENTED JUNE 13, 1905.
R. H. STOCOUM & T. WILLSIE.
PHOTOGRAPHIC SHUTTER.
APPLICATION FILED JUNE 21, 1904.

2 SHEETS—SHEET 2.

Witnesses
H. B. Hallock.
L. H. Morrison

Inventors
Rollin H. Stocoum
Thomas Willsie
By W. Truton Williamson
Atty.

No. 792,361.

Patented June 13, 1905.

UNITED STATES PATENT OFFICE.

ROLLIN H. STOCOUM AND THOMAS WILLSIE, OF IONIA, MICHIGAN.

PHOTOGRAPHIC SHUTTER.

SPECIFICATION forming part of Letters Patent No. 792,361, dated June 13, 1905.

Application filed June 21, 1904. Serial No. 213,480.

*To all whom it may concern:*

Be it known that we, ROLLIN H. STOCOUM and THOMAS WILLSIE, citizens of the United States, residing at Ionia, county of Ionia, and State of Michigan, have invented a certain new and useful Improvement in Photographic Shutters, of which the following is a specification.

Our invention relates to a new and useful improvement in photographic shutters, the object of which is to bring to a perfect balance actinically all the light passing to the sensitive film under the varying conditions found to exist in the solar spectrum, and therefore we provide a shutter which will differentially vary the relative exposure given to the different portions representing the foreground, intermediate, and upper sky portions, so that a balanced negative under all conditions is the result obtained by its use, to make possible the correct exposure under the varying existing conditions by giving each ray in the solar spectrum the proper length of exposure according to its different relative actinic value, whether the correct exposure is of the shortest or longest duration, each ray receiving its proper exposure by differentially admitting the light to dwell upon the sensitive film a longer or shorter time according to its relative actinic value, so that all parts of the film are actinically equally exposed.

It is generally understood that the different rays in the solar spectrum vary in their actinic value, approximately as from one to eight. Commencing at the earth, the red rays, representing the immediate foreground, are of the lowest actinic value, which under certain atmospheric conditions require eight or more times the length of exposure to equally effect a sensitive film as do the upper rays, representing the sky portion, and the rays from the bottom upward require a relative shorter exposure than the preceding lower rays according to their different actinic value. The relative actinic values above stated do not exist under all the different conditions between the lower and upper rays for the reason that there is a greater difference between the actinic values of the foreground and upper portions in intense light than when a dull condition exists, so that to properly expose equally a sensitive film according to the varying conditions, as above stated, we have provided a shutter which may be adjusted to give the proper relative exposure of the rays of high and low actinic value and provide means for increasing or decreasing the exposure according to the atmospheric conditions existing, and we also provide means whereby one side of the film may have a greater exposure than the other side where conditions exist requiring the same.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 5:
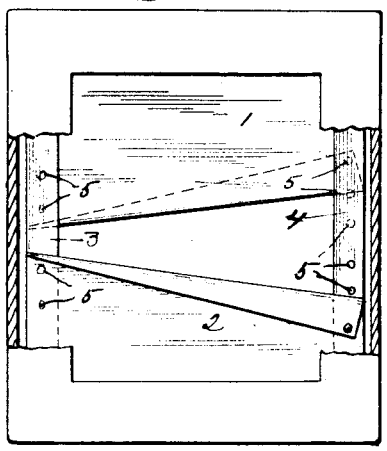

Figure 1 is a vertical section through our improved shutter, showing the parts in their normal position just before exposure; Fig. 2, an elevation of one end of the shutter, the central portion being broken away; Fig. 3, an elevation of the other end of the shutter, a portion of the center being broken away; Fig. 4, a vertical section taken on the line 4 4 of Fig. 1, the central portion being broken away; Fig. 5, a front elevation of a modified form of shutter, a portion of the casing being broken away to show the means for adjusting the curtains to expose one side of the plate more than any other side.

Our device is a focal-plane shutter and may be applied in front of the lens, at the rear of the same, in between the lenses, when two are used, or directly in front of the sensitive film.

A represents the casing, which may be of any shape or design. B represents the openings through the casing through which the rays of light pass to the sensitive film. The casing is divided along the line A', and the two parts of this casing may be hinged together, as represented at $A^2$, and secured at the other side by a latch, as represented at $A^3$. By dividing the casing in this manner the operating parts are made easily accessible and the rolls may be removed easily therefrom. Upon the interior and at the lower end of the casing are journaled the two rolls C and D. The roll C is journaled upon a shaft C', and this shaft has secured upon one end outside of the casing the knurled knob E and the ratchet-wheel F. A spring-pawl G engages said ratchet-wheel. Upon the interior of the roll C is a coil-spring H, one end secured to the shaft C' and the other end to the roll C, tending to always revolve the roll in the direction of the arrow. (Shown in Fig. 1.) The spring H may be tightened by the turning of the knob E, the ratchet-wheel F and pawl G holding the shaft C' against retrograde movement, and by manipulating the pawl G the spring may be loosened.

I and J are two rolls journaled upon the interior of the casing at the upper end thereof. K represents two belts, one located upon each side of the casing, one end of said belts being secured to the roller C and the other end to the roller I. L is a curtain of opaque material secured to a portion of these belts and extending entirely across from one belt to the other.

The shaft of the roll I extends through the casing, and has provided upon its outer end the knurled knob I' and a ratchet-wheel M. N is a spring-actuated release-pawl normally engaging the ratchet-wheel M and holding the rolls against the tension of the spring H in the lower roll C, and by disengaging the pawl N the spring H will act to coil the belts K and curtain L upon the lower roll C, and by manipulating the knob I' the belts may be coiled upon the upper roll I.

O represents two belts located one upon each side of the interior of the casing, the lower end of said belts being secured to the roller D and the upper end of the belts to the roller J. P is a curtain of opaque material secured upon a portion of these belts and extending entirely across from one belt to another.

The roller J is journaled upon a stationary shaft J', and upon the interior of the roller J is arranged a light coil-spring Q, one end of which is secured to the stationary shaft J' and the other end to the roller J, tending to revolve said roller always in the direction of the arrow shown in Fig. 1. The spring Q is much lighter than the spring H.

R is a gear-wheel secured to the roller C and adapted to revolve therewith. S is a gear-wheel secured to the roller D and adapted to revolve therewith. These two gear-wheels are normally in mesh with one another, and thus it will be seen that when the spring H is released, so as to coil the belts K upon the roll C, the motion will be communicated to the roll D and cause the belts O to be coiled upon said roll D against the tension of the spring Q. Thus the two curtains L and P will be caused to travel downward across the face of the sensitive film, and the curtains are so arranged preliminary to the exposure that the curtain P will follow the curtain L at a certain distance, leaving a space in between the lower edge of the curtain P and the upper edge of the curtain L, through which space the rays of light pass to the sensitive film to make the exposure; and our invention consists in so constructing the shutter that this space through which the exposure is made is gradually decreased, increased, or allowed to remain the same width while said space is passing the sensitive film, and we accomplish the increasing or decreasing of this space by changing the relative sizes of the gears R and S. Thus it will be seen that in the form shown in Fig. 1 when the spring H is released the curtain L will begin to descend, as will also the curtain P, following the same, and at the top of the opening B through the casing the space between the two curtains will be of considerable width, thus giving the foreground the proper exposure, and as the gear S is much smaller than the gear R as the curtains travel downward the space between the two will be gradually decreased, as the curtain P will travel faster than the curtain L, and at the lower end of the exposure-opening or at the point where the rays of light have the highest actinic value the space will be decreased to such an extent that all parts of the sensitive film have received the proper amount of exposure to make a uniform negative. By removing the gears R and S and substituting gears of different relative sizes the relative change in the space may be varied, according to existing circumstances—as, for instance, on exceedingly bright days it would probably be necessary to have the width of the space at the lower end reduced to one-eighth or more of the width of the space at the beginning, but on dull cloudy days it might be necessary to only reduce this space one-half while making the exposure. By increasing or diminishing the space at the beginning of the exposure the length of the exposure to all parts of the film may be increased or decreased, while at the same time changing the relative exposure on the different parts of the plate according to the actinic value of the rays passing to the plate. The increasing or diminishing of the space between the curtains at the beginning of the exposure is accomplished by setting the curtains as desired.

In order to set the curtains and place them in position for focusing, the following construction is utilized: That end of the shaft C' nearest the gears instead of being journaled in the framework or case A is journaled in the slide T, adapted to slide laterally in the case. Thus by pushing the knob E to one side the gear R may be thrown out of mesh with the gear S, and as soon as this is done it will be seen that the spring Q in the roll J will act to coil the curtain P upon said roll. Thus just after an exposure has been made the curtain P will be across the openings B, while the curtain L will be coiled upon the roll C, and in order to focus for the next picture it is only necessary to push the knob E to one side, when the curtain P will instantly be removed from across the openings B and the space will be clear for focusing. Then when it is desired to set the shutter for the next photograph the knob I' upon the roller I is revolved, bringing the curtain L across the openings B, and then by turning the knob D', secured to the roller D, the curtain P may be set so as to begin the exposure with any width of space desired between the two curtains, and by throwing the two gears into mesh with one another again the curtains are held in the position so set until the shutter is released. An indicator $D^2$ may be located upon the shaft of the roller D, so as to indicate the different widths of the space between the curtains at the beginning of exposure.

U is an indicator adapted to be operated by the turning of the shaft C' for indicating the strength of the spring H for setting the shutter to different speeds.

In the diagram shown in Fig. 6 we have shown the curtains as though they worked vertically in a flat condition, instead of being coiled, to better illustrate their movements. B indicates the openings through which the rays of light pass.

The diagram $a$ represents the position of the curtains after the gears have been separated and they are in a position for focusing. $b$ represents the positions of the curtains after they have been set for exposure. The diagram $c$ represents the position of the curtains at the beginning of the exposure, and $d$ represents the positions of the curtains at the ending of the exposure. $e$ represents the position after the exposure has been made.

In Fig. 5 we have shown a modified form of construction in which the ends of the curtains 1 and 2 are secured to the belts 3 and 4 by means of buttons 5 or other removable fastening devices, so that one side or the other of the ends may be folded back upon themselves so that the exposed space between the two curtains will be wider upon one side than the other. Thus while the space between the two curtains will be gradually decreased or increased, as the case may be, one side of the photograph will receive more exposure than the other. This is necessary in some photographs where, for instance, one side of the photograph takes in a stretch of water.

Of course we do not wish to be limited to the exact construction here shown, as considerable modifications could be made without departing from the spirit of the invention.

Having thus fully described our invention, what we claim as new and useful is—

1. In a photographic shutter, a case, said case provided with openings through which the light passes to the sensitive film, two rollers, each journaled in opposite ends of the casing, two belts arranged upon each side of the casing, the ends of said belts attached to the two rollers, a curtain of opaque material secured upon a portion of the belts, a coil-spring located in one of the rollers, the tendency of said spring being to coil the belts and curtain upon said rollers, a second set of two rollers journaled in opposite ends of the casing, two belts, the ends of which are connected to the second set of rollers, said belts extending vertically parallel with the other belts, a curtain of opaque material secured upon a portion of the second set of belts, and means for revolving the second set of rollers from the spring-actuated roller of the first set so as to cause the second curtain to follow the first curtain across the exposure-openings so that a space will be left between the edges of the curtains.

2. In a photographic shutter, a casing, exposure-openings formed through the casing through which the rays of light may pass to the sensitive film, two opaque curtains adapted to travel across the exposure-openings so that a space will be left between the top edge of one curtain and the bottom edge of the other, and means for operating said curtains.

3. In a photographic shutter, having a casing, exposure-openings formed through the casing through which the light is adapted to pass to the sensitive film, two opaque curtains arranged within the casing, said curtains adapted to travel across the exposure-openings in such a manner that one curtain follows the other so as to leave a space between the two curtains, means for removing both curtains from in front of the exposure-openings for the purpose of focusing, and means for resetting the curtains to give any width space desired between the curtains at the beginning of the exposure, as and for the purpose specified.

4. In a photographic shutter, a casing, said casing provided with exposure-openings through which the rays of light may pass to the sensitive film, two curtains arranged within the casing and adapted to travel across the exposure-openings in such a manner that one curtain follows the other, leaving a space between the two curtains through which the exposure is made, spring-actuated means for causing the travel of the curtains, spring-actuated means for withdrawing the curtain covering the exposure-opening at the end of the exposure for the purpose of focusing, and means for resetting the curtains so that the space between the curtains may be adjusted to any desired width at the beginning of the exposure, as and for the purpose specified.

5. In a photographic shutter, a casing, said casing provided with exposure-openings through which the rays of light pass to the sensitive film, a set of two rollers arranged within the casing and at opposite ends thereof, two belts, the ends of which are connected to the two rollers, the two belts being arranged at opposite sides of the casing out of alinement with the exposure-openings, an opaque curtain secured to a portion of the belt and extending from one to the other, one of the rollers of the set forming the driving-roller, a shaft extending through the driving-roller and normally held stationary in the casing, a coil-spring arranged within the driving-roller, one end of the spring secured to the shaft and the other end to the roller, said spring tending to coil the belts upon said driving-roller, means for holding the spring against action until released, means for adjusting the strength of the spring for regulating the speed of the shutter, a second set of rollers arranged in opposite ends of the casing, two belts arranged in alinement with the belts of the other set of rollers, said belts secured to the two rollers, an opaque curtain secured to a portion of the second set of belts, a gear-wheel secured to the driving-roller, a gear secured to one of the second set of rollers to cause the two belts to move at the same time, the second belt adapted to follow the first belt across the exposure-opening at a distance therefrom, a light spring arranged in one of the rollers of the second set, said spring being much lighter in strength than the driving-spring, and for the purpose of removing the second curtain before the exposure-opening for focusing, and means for sliding the gears in and out of mesh with one another, and means for setting the curtains in a predetermined position before exposure, as and for the purpose specified.

6. In a photographic shutter, a casing, said casing provided with exposure-openings through which the rays of light pass to the sensitive film, two curtains arranged within the casing adapted to travel past the exposure-opening, one curtain following the other so that a space will be left between the upper edge of one curtain and the lower edge of the other curtain, means for actuating the curtains, means for adjusting the edges of the curtains upon each side of the space so that the edges may be parallel or adjusted at an angle to one another, as and for the purpose specified.

In testimony whereof we have hereunto affixed our signatures in the presence of two subscribing witnesses.

ROLLIN H. STOCOUM. [L. S.]
  THOMAS WILLSIE. [L. S.]

Witnesses:
  C. OSCAR THOMPSON,
  L. W. MORRISON.